United States Patent [19]

Wiemers

[11] 4,360,216
[45] Nov. 23, 1982

[54] UNIVERSALLY-POSITIONABLE BILATERALLY-SYMMETRICAL THREE-CYLINDER-OPERATED HITCH

[76] Inventor: George H. Wiemers, Rte. 1, Greenview, Ill. 62642

[21] Appl. No.: 213,746

[22] Filed: Dec. 5, 1980

[51] Int. Cl.³ .............................................. B60D 1/00
[52] U.S. Cl. ................................ 280/479 R; 172/272
[58] Field of Search .......... 280/479 R, 479 A, 478 R, 280/478 A, 490 R, 402; 172/272, 273, 274, 275, 831; 414/563

[56] References Cited

U.S. PATENT DOCUMENTS 3,345,083 10/1967 Roberson ........................ 280/479 R
3,432,184 3/1969 Tweedy ........................... 280/479 R

FOREIGN PATENT DOCUMENTS 1065281 9/1959 Fed. Rep. of Germany ... 280/479 A

Primary Examiner—John A. Pekar
Attorney, Agent, or Firm—Ralph F. Staubly

[57] ABSTRACT

A hitch element is fixed to the end of the piston rod of a horizontally disposed double-acting hydraulic cylinder. The closed end of the cylinder is swivelly connected to the bight portion of a horizontally disposed rearwardly open A-shaped frame underlying and fixed to the rear part of a truck chassis. An upright downwardly-open omega-shaped frame is rigidly connected at its ends to the ends of the A-shaped frame. A pair of upright double-acting cylinders have their closed ends swivelly connected to opposite upper corners of the upright frame, and have their piston rods connected, by X-connected bearing sleeves, to the piston rod of the horizontally disposed cylinder. A yoke prevents movement of the bearing sleeves away from the end of the horizontal cylinder. The upright cylinders co-operate to vary both vertical and lateral positioning of the hitch element.

4 Claims, 6 Drawing Figures

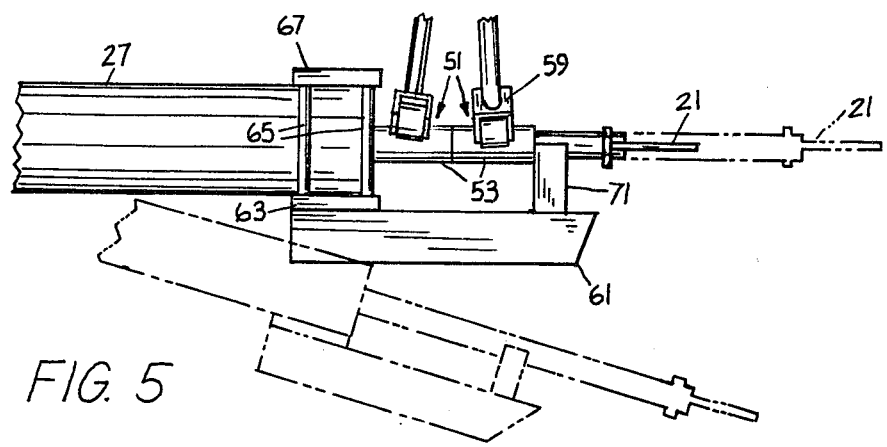
FIG. 5
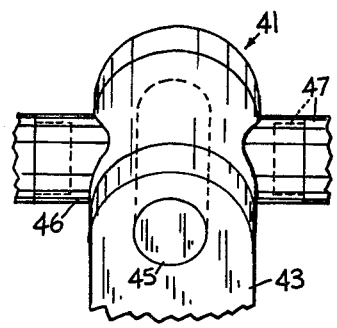
FIG. 6
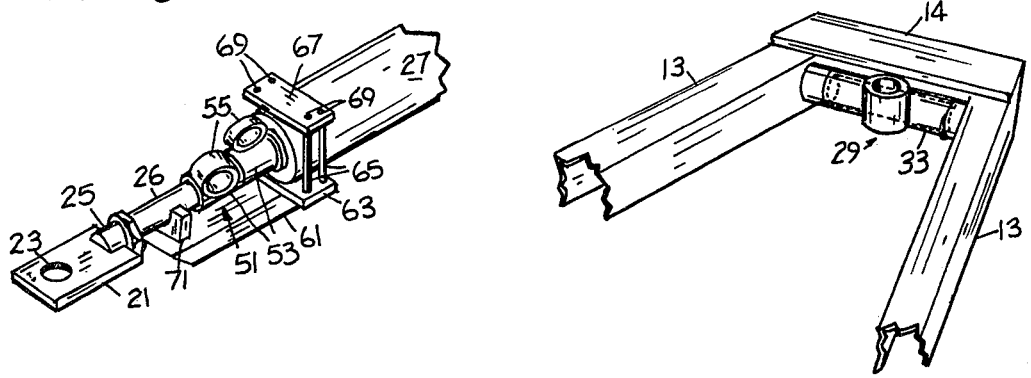
FIG. 3
FIG. 4

UNIVERSALLY-POSITIONABLE BILATERALLY-SYMMETRICAL THREE-CYLINDER-OPERATED HITCH

BACKGROUND AND OBJECTS OF THE INVENTION

It is known to make hitches universally movable by the use of many hydraulic cylinders (e.g. U.S. Pat. No. 3,432,184 to Tweedy). But there is not known any hitch which employs only three cylinders in a compact bilaterally symmetrical arrangement. It is the principal object of this invention to provide such a hitch. Other objects and advantages will appear hereinafter.

BRIEF DESCRIPTIONS OF THE DRAWING FIGURES

FIG. 3 is a fragmentary perspective view of the rear end of the horizontal-cylinder assemblage.

FIG. 4 is a fragmentary perspective view of the forward end of the horizontal frame-portion.

FIG. 5 is an enlarged fragmentary view of the lower right third of FIG. 1.

FIG. 6 is an enlarged fragmentary view of the universal coupler 41 in the upper right portion of FIG. 2.

Figure 2:
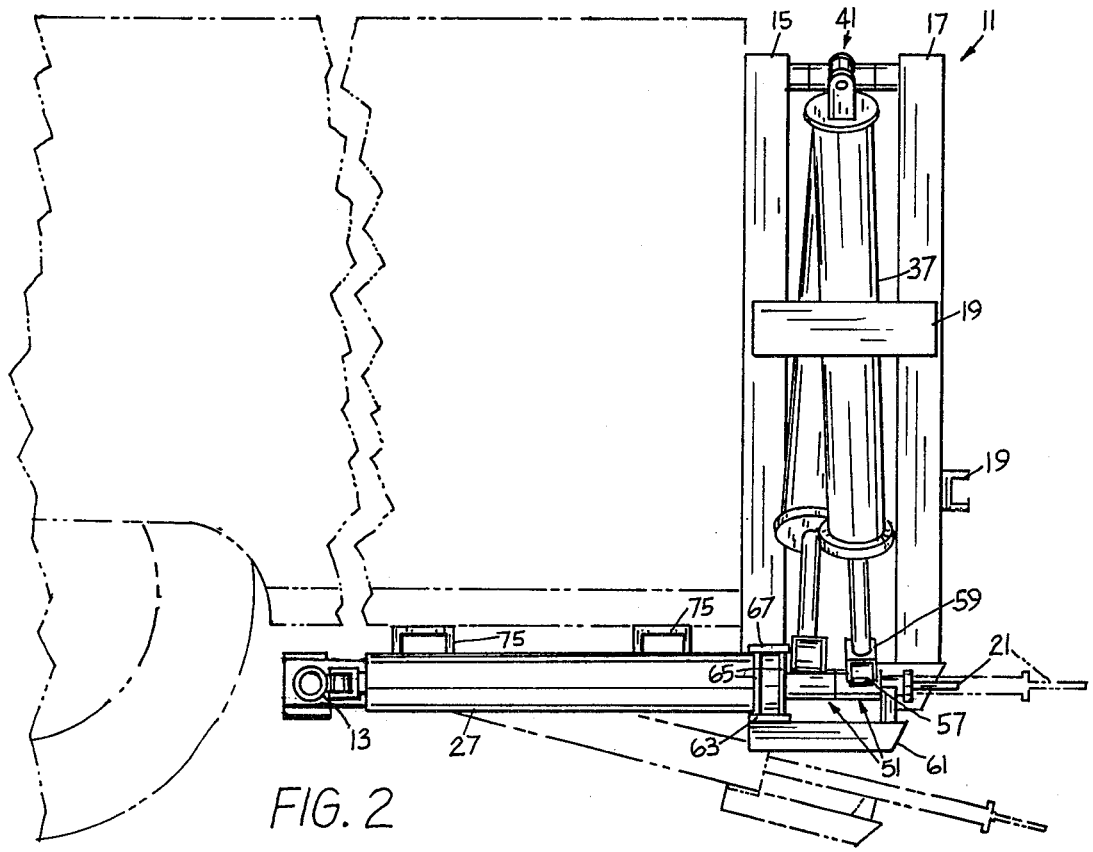
FIG. 2 is a side elevational view of the hitch as seen from the left of FIG. 1.

DETAILED DESCRIPTION With reference now to the drawings, the numeral 11 generally designates the hitch assemblage, which has an A-shaped horizontally disposed base frame 13 and a vertically disposed frame formed of two parallel inverted U-shaped members 15 and 17. The two frames are made of channel or angle bars which are rigidly interconnected, and the frames are interconnected at their open ends (lower right of FIG. 2) all as by welding or bolting, and are crossbraced by bars 19.

The hitch element 21 is a rectangular steel plate apertured at 23 to receive (1) a hitch pin passing downwardly through it and (2) a hitch clevis (both not-shown conventional elements). The hitch element 21 is notched to receive the welded-in end 25 of the piston rod 26 of a double-acting horizontally-disposed hydraulic cylinder 27 (of known construction).

The forward end of the cylinder 27 is fastened to the frame 13 by a universal coupler 29 (FIG. 4) of known construction, by a vertical pin through a clevis to be coupled to the front end of the cylinder 27 (both not shown). The pin passes vertically through the bearing sleeve 31. Sleeve 31 is welded to the horizontal sleeve 33 which is rotatably mounted between the side members of the frame 13. The cylinder 27 provides the fore-aft variable positioning of the hitch element 21.

Figure 1:
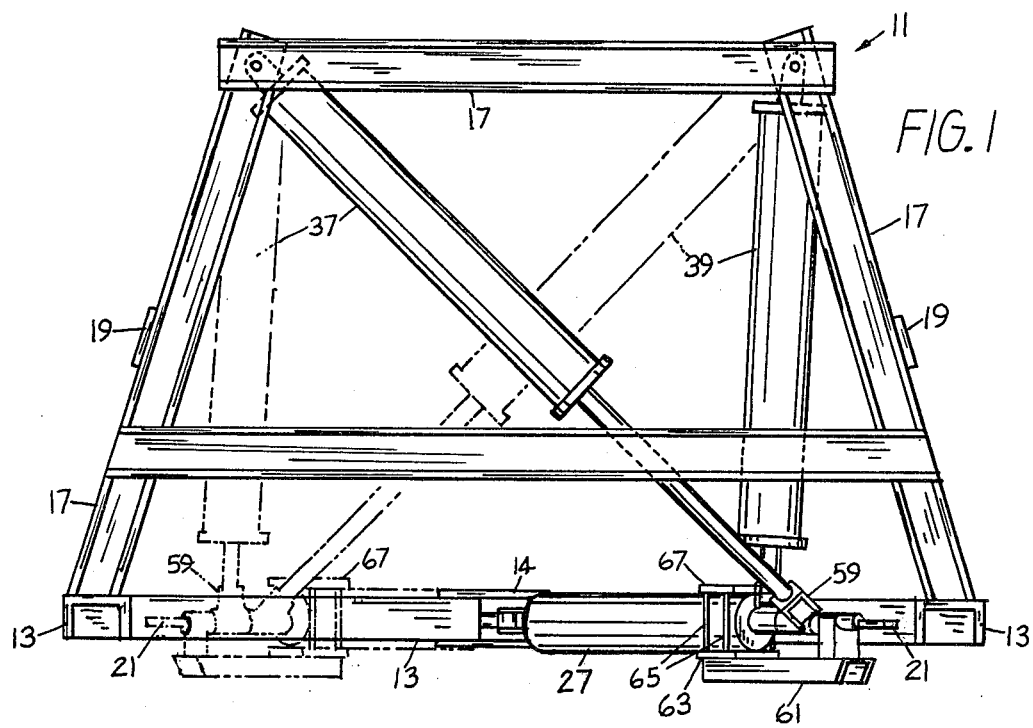
FIG. 1 is a rear elevational view of the hitch assemblage.

Lateral and vertical variable positioning of the hitch element 21 is provided by a pair of double-acting cylinders 37 and 39, which are attached to the upper corners of the vertical frame 15-17 by universal couplers 41 similar to part 29 in FIG. 4. Coupler 41 comprises a clevis 43 on the cylinder 37 and a pivot pin 45 passing through a sleeve 46. The sleeve 46 rotates on pintles 47 welded to the frame elements 15 and 17. The cylinders 37 and 39 are universally swingable between their near vertical and their near 45° orientations of FIG. 1.

The ends of piston rods 49 of the upright cylinders 37 and 39 are coupled to the piston rod 26 of the horizontally disposed cylinder 27 by universal couplers 51. Couplers 51 comprise short sleeves 53 rotatable on the piston rod 26, and short bearing sleeves 55 welded to the sleeves 53. Pivot pins 57 couple the clevises 59 on the ends of the piston rods 49 to the bearing sleeves 55.

A small elongated plate 61 (FIGS. 2 and 3) underlies couplers 55 and is fixed to the end of the cylinder 27 by being welded to a plate 63. The plate 63 is fastened to the cylinder end by threaded rods 65 passing vertically through alined apertures in the plate 63 and a parallel plate 67. Nuts 69 clamp the plates 63-65 and thus the plate 61 to the end of the cylinder 27. The plate 61 has welded thereto a yoke 71 which acts as a thrust bearing that (1) prevents undesirable rearward sliding of the couplers 51 on the piston rod 26, and (2) acts as a stop to arrest forward movement of the hitch element 21 by engaging a large nut 73 welded to the element 21 and to the piston rod 26.

Three multi-passage valves of known construction (not shown), one for each cylinder, would be mounted as a unit at any convenient location on or adjacent the assemblage, which is herein shown as being mounted on the rear of a truck T by channel bars 75 (FIG. 2) welded to the frame 13 and welded (or bolted) to the chassis C of the truck.

The invention having been described, what is claimed is:

1. A universally-positionable bilaterally-symmetrical hitch, comprising: a horizontally disposed rigid U-shaped base frame open at its rear end; a horizontally disposed double-acting hydraulic cylinde endwise universally coupled medially to the bight portion of said frame and having its piston rod extendable beyond the open end of said base frame; a downwardly open generally omegashaped rigid upright frame bridging and rigidly connected to the ends of said base frame; a pair of upright double-acting hydraulic cylinders having the closed end of each universally connected to said upright frame adjacent an end of the bight portion thereof; a hitch element; and means universally coupling said hitch element to the outer ends of each piston rod.

2. A hitch according to claim 1 wherein said hitch element is rigidly fixed to the outer end of the piston rod of said horizontally disposed cylinder, and wherein ends of the piston rods of said upright cylinders are universally coupled to the piston rod of said horizontally disposed cylinder.

3. A hitch according to claim 2 wherein the couplings between said piston rods comprise two short bearing sleeves on the horizontally disposed piston rod and other short bearing sleeves welded one to each of said two bearing sleeves, a clevis on the lower end of each upright piston rod, and a bearing pin coupling each said clevis to each said other short bearing sleeve.

4. A hitch according to claim 3 and additionally comprising a bar underlying said first-mentioned short bearing sleeve, and a yoke fixed to said bar and straddling said horizontally disposed piston rod and holding said bearing sleeves against following said hitch element rearwardly along said piston rod.

* * * * *